S. T. HOGAN & F. KNETSCH, Jr.
COTTON CHOPPER.
APPLICATION FILED SEPT. 10, 1908.
913,659.
Patented Feb. 23, 1909.
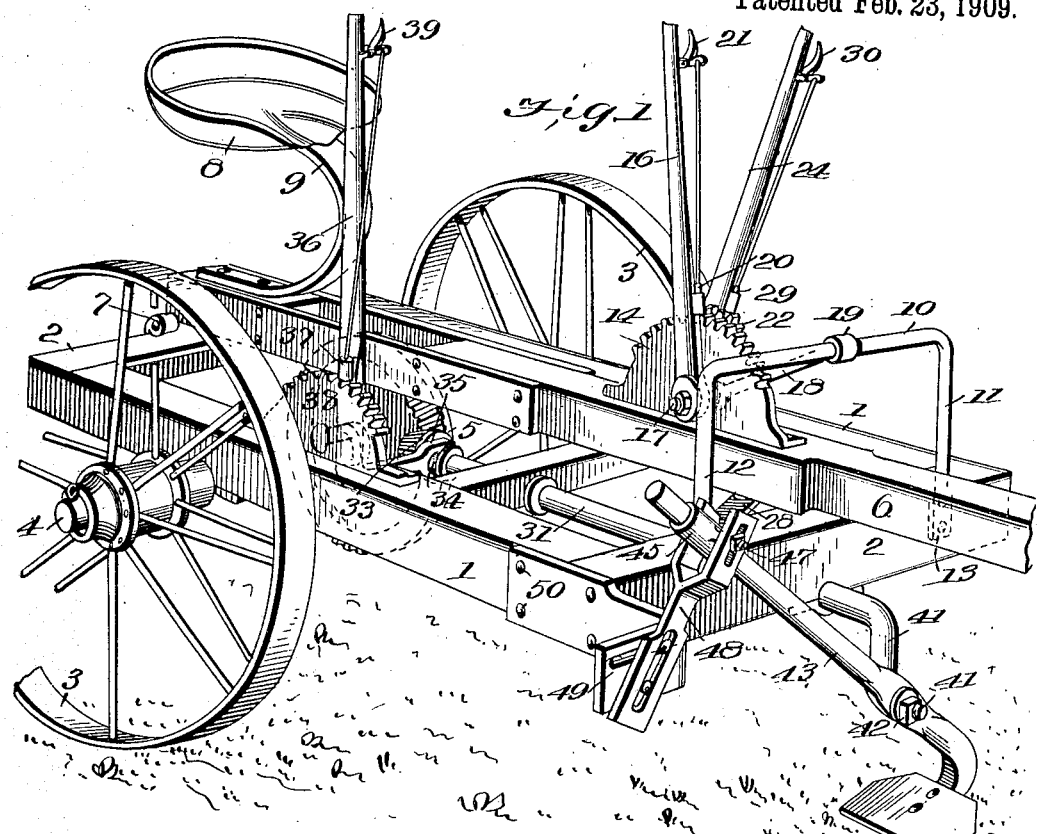
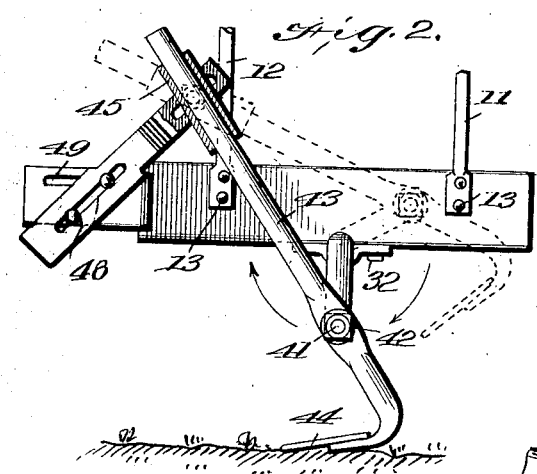
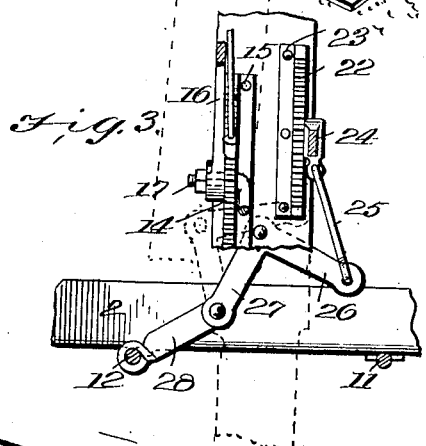
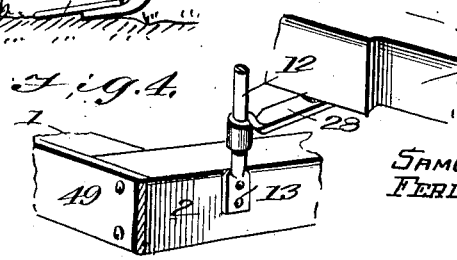
WITNESSES
F. C. Barry
C. E. Tramer
INVENTORS
SAMUEL T. HOGAN
FERDINAND KNETSCH, JR.
BY
Munn & Co.
ATTORNEYS

UNITED STATES PATENT OFFICE.

SAMUEL THOMAS HOGAN AND FERDINAND KNETSCH, JR., OF CREEDMOOR, TEXAS, ASSIGNORS OF ONE-THIRD TO JOHN B. OATMAN, OF CREEDMOOR, TEXAS.

COTTON-CHOPPER.

No. 913,659.      Specification of Letters Patent.      Patented Feb. 23, 1909.

Application filed September 10, 1908. Serial No. 452,512.

*To all whom it may concern:*

Be it known that we, SAMUEL THOMAS HOGAN and FERDINAND KNETSCH, Jr., citizens of the United States, and residents of Creedmoor, in the county of Travis and State of Texas, have invented certain new and useful Improvements in Cotton-Choppers, of which the following is a specification.

Our invention is an improvement in cotton choppers, and consists in certain novel constructions and combinations of parts hereinafter described and claimed.

Referring to the drawings forming a part hereof Figure 1 is a perspective view of the improvement. Fig. 2 is a partial front view partly in section. Fig. 3 is a plan view of a portion of the chopper parts thereof being in section, and Fig. 4 is a detail perspective view of a portion of Fig. 3.

The present embodiment of the invention comprises a frame, consisting of longitudinal beams 1, and cross beams 2, supported by wheels 3, secured to an axle 4, journaled on the frame, and provided at its center with a bevel gear 5.

A tongue 6 is hinged as at 7 to the rear of the frame, and rests upon the upper surface thereof, a seat 8 being connected by a spring plate 9 with the rear end of the tongue.

A yoke is connected with the frame, the body portion 10 lying above the tongue, and the arms 11, 12 being secured to the front cross beam as at 13 on each side of the tongue.

A toothed quadrant 14 is secured to the tongue by bolts 15, at one side thereof, and a lever 16 is secured to the angular portion 17, of a link 18, provided with a sleeve 19 in which the body portion 10 of the yoke is slidable, and the lever is provided with a tooth 20 engaging the quadrant and operated by a grip 21, for retaining the lever in its adjusted position. A second quadrant 22 is secured to the opposite side of the tongue by bolts 23, and a lever 24 is journaled on the quadrant, and the lever is connected by a link 25, with one arm 26, of a bell crank, whose other arm 27 is connected by a link 28 with the arm 12 of the yoke, the lever being retained in position by a tooth 29 engaging the quadrant and actuated by a grip 30.

A shaft 31 is journaled in bearings 32 on the cross beams 2 and the rear end of the shaft is provided with a bevel gear 33 slidable thereon but constrained to rotate therewith, the gear having a groove 34 in which engages a fork 35, integral with and arranged at right angles to a lever 36, journaled on the frame and provided with a tooth 37 for engaging a toothed quadrant 38, secured to the frame, the tooth being actuated by a grip on the lever.

It will be evident from the description that by moving the lever forward and backward the bevel gear 33 may be moved into and out of mesh with the bevel gear 14 on the power shaft 4.

The forward end of the shaft 31 projects beyond the frame and is cranked as at 40, the cranked portion being provided with a journal pin 41, engaging a bearing 42, in the shaft 43, of a hoe 44, the shaft being slidable in a sleeve 45, provided with trunnions 46, engaging slots 47 in the arms of a fork 48, secured to a bracket 49, connected with the frame as at 50.

It will be evident that when the machine is drawn through the field, with the gear 33 in mesh with the gear 14, the shaft 31 will be rotated, thus swinging the blade of the hoe into and out of contact with the ground, and in the direction of the arrows in Fig. 2.

By means of the lever 16 the front end of the frame may be raised or lowered with respect to the tongue, to cause the hoe to cut more or less deep in the ground, and by means of the lever 24, the front end of the frame may be moved longitudinally with respect to the tongue, to keep the frame properly alined with respect to the cotton row regardless of the position of the tongue.

It will be evident from the description that the frame may be tilted both vertically and longitudinally with respect to the tongue for the purpose of adjusting the depth of the stroke of the hoe, and to adjust the transverse position of the impact.

I claim:

1. A cotton chopper comprising a wheel supported frame, a shaft journaled longitudinally thereof and provided with a cranked portion having a journal-pin, a hoe provided with a bearing for receiving the journal-pin, a fork secured to the frame and provided with longitudinally slotted arms, a sleeve through which the handle of the hoe slides, said sleeve being provided with trunnions engaging the slots, and means for rotating the shaft.

2. In a device of the class described, a frame, a hoe, means for reciprocating the hoe transversely of the frame, and a guide for the handle thereof comprising a sleeve through which the handle slides, said sleeve being provided with trunnions, and a fork secured to the frame and having slotted arms with which the trunnions engage.

3. In a device of the class described, a wheel supported frame, a tongue pivoted to the rear of the frame, and lying on the upper surface thereof, a yoke having its arms secured to the frame on each side of the tongue, a lever journaled on the tongue, a link rigid with the lever and connected with the body of the yoke, a second lever journaled on the frame, and an elbow lever pivoted to the frame said second lever being connected with one of the arms thereof, and a link connecting the other arm with an arm of the yoke.

SAMUEL THOMAS HOGAN.
FERDINAND KNETSCH, Jr.

Witnesses:
J. G. SMITH,
CARL HARTMAN.